2,027,676

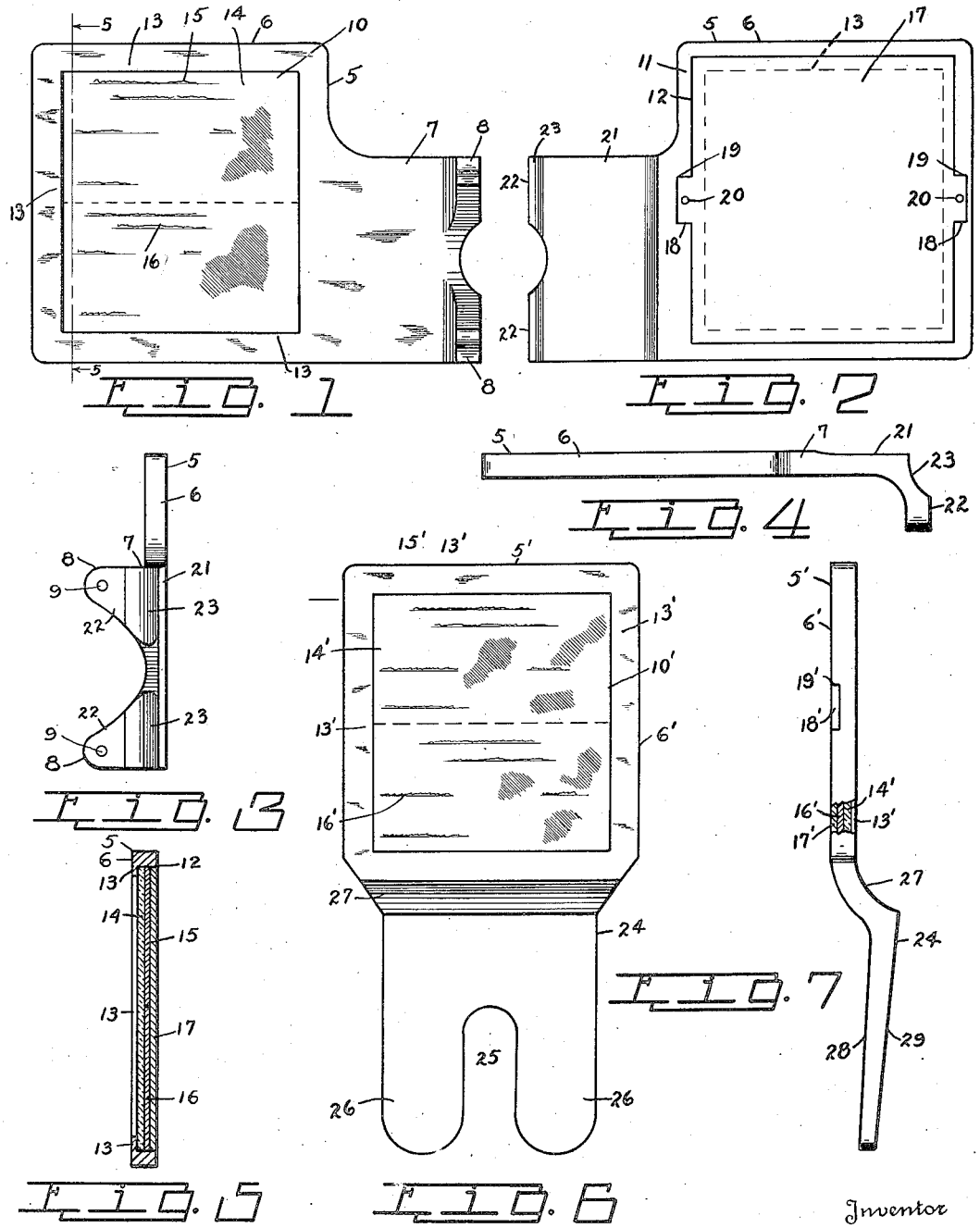
Jan. 14, 1936. J. CHUCHIE 2,027,676
MOTOR VEHICLE DRIVER'S PERMIT AND REGISTRATION CARD HOLDER
Filed March 23, 1934
Inventor
JOHN CHUCHIE Patented Jan. 14, 1936

UNITED STATES PATENT OFFICE 2,027,676

MOTOR VEHICLE DRIVER'S PERMIT AND REGISTRATION CARD HOLDER

John Chuchie, Dunbar, Pa.

Application March 23, 1934, Serial No. 717,109

3 Claims. (Cl. 40—10)

The present invention relates to improvements in motor vehicle driver's permit and registration card holders, one so designed and secured to a motor vehicle that it may be visible at all times.

In driving a motor vehicle from time to time, the operator is subjected to the possibilities of being stopped by a traffic officer or an officer of the law for a traffic violation which necessitates the operator of the motor vehicle exhibiting an operator's permit and registration card. As a general rule such cards are carried in inaccessible places for immediate display, such for instance as bill folds, pocket books and the like, and when in such places necessitates a great deal of effort and time on the part of the operator before the necessary cards are exhibited to the officer.

It is an object of my invention therefore to provide a driver's permit and registration card holder that may be so positioned within the motor vehicle that it may be plainly visible through the wind shield.

Another object of my invention is the provision of a driver's permit and registration card holder equipped with engaging means for securing the holder to any suitable bracket or to any suitable portion of the motor vehicle and so positioned that the cards are visible through the windshield.

A still further object of my invention is the provision of a driver's permit and registration card holder in which the holder is so constructed for ready removal of the cards when desired.

A still further object of my invention is the provision of a holder of simple construction and one that is inexpensive to manufacture.

A still further object of my invention is the provision of a permit and registration card holder that is of integral structure.

My invention consists in the novel details of construction and arrangement of parts, described and claimed in the following specification and illustrated in the accompanying drawing, and while I have illustrated and described preferred embodiments of my invention, I would have it understood that changes may be made in details without departing from the spirit or scope of the claims hereto appended.

Figure 1 is a front elevational face view of my improved driver's permit and registration card holder.

Figure 2 is a rear elevational view of the holder, illustrating a means for securing the driver's permit and registration card in assembled position in the holder.

Figure 3 is an end elevational view looking in the direction of the arrows of Figure 1.

Figure 4 is a top plan view of my holder taken on Figure 1.

Figure 5 is a vertical sectional view taken on line 5—5 of Figure 1 looking in the direction of the arrows.

Figure 6 is a front elevational face view of a modified form of my holder.

Figure 7 is an end elevational view of the modified form of holder illustrated in Figure 6, a portion being shown broken away illustrating the parts and assembly.

My improved card holder for driver's permit and registration cards, comprises a body 5 having a substantially rectangular portion 6 and an arm 7, the arm being of reduced size and provided with engaging lugs 8, disposed at right angles to the arm, the lugs at the crown being arcuate. The lugs are provided with apertures 9 for reception of bolts or the like for securing the holder to any suitable means on the motor vehicle.

The rectangular portion of the body is provided with a window opening 10, the rear portion 11 of the rectangular portion 6, is provided with a rectangular recessed portion 12 which is in excess of the size of the window portion and to a depth of approximately one-half in cross section to the thickness of the rectangular portion 6. The recessed portion 12 forms flanges 13 around the window opening, and receives therein a transparent closure 14, of glass, celluloid or any other suitable transparent material, the outer face of which impinges against the inner faces of the flanges 13. The driver's permit and registration cards 15 and 16 are next placed in the recessed portion 12 and these are held in position by a closure back 17 of any suitable material, such as cardboard, fiber board or the like, and is equipped with ears 18 that engage cut out portions 19 in the rear wall of the rectangular portion 6, the closure being held in position by screws 20.

The arm 7 of the holder has its rear wall 21 offset from the rear face of the rectangular body portion 6. The lugs 8 of the arm 7 has a portion of the outer wall 22 concaved at 23 providing a snug engagement around one of the vertical standards when the holder is secured to some portion of the body, also providing an offset around the windshield standard.

In the form of the invention illustrated in Figures 6 and 7, the holder 5' has a rectangular body 6' provided with a window opening 10', the rear portion 11' of the body 6' having a recessed portion 12' which is in excess of the size of the window portion and of a depth of approximately one-half in cross section to the thickness of the rectangular body portion 6'. The recessed portion 12' forms flanges 13' around the window and receives therein a transparent closure 14' of any suitable material. The driver's permit and registration cards 15' and 16' are inserted in the recessed portion and are held in position by the closure back 17' equipped with ears 18' that engage cut out portions 19' in the body, the closure back being held in position by screws 20' or the like.

The base of the rectangular body 6' has a reduced portion 24 in width extending therefrom and it is provided with a longitudinal cut out portion 25 midway the vertical edges, forming legs 26. The legs engage a suitable bracket (not shown) for securely holding the card holder in a vertical position and in such a manner that the cards will be visible through the windshield of the motor vehicle. The legs are offset from the rectangular body by an arcuated portion 27, the body, offset portion and legs being integral. The outer walls of the legs 28 and 29 converge downwardly, the greatest thickness being at the junction of the legs with the arcuated portion 27 of the rectangular body.

In actual use the holder is secured in some suitable manner or to some suitable bracket inside the motor vehicle and so positioned adjacent the windshield that the cards are visible from the outside.

It is to be understood that various changes may be made in the device herein described without departing from the spirit or the scope of the claims hereto appended.

What I claim is:—

1. A motor vehicle certificate holder comprising a body portion, an arm extending therefrom provided with right angularly disposed lugs, an arcuate portion in the outer angular wall of each of said lugs, one wall of said arm being offset from said body portion, the body portion provided with a recess and smaller recesses communicating with the body recess, the smaller recesses equipped with a bore, a closure plate having ears engageable in said body recess and smaller recesses and an opening in the body portion smaller in size than said recess in the body portion.

2. A motor vehicle certificate holder comprising a body portion, an arm extending therefrom provided with right angularly disposed lugs, an arcuate portion in the outer angular wall of each of said lugs, said lugs equipped with apertures, one wall of said arm being offset from said body portion, the body portion provided with a recess and smaller recesses communicating with the body recess, the smaller recesses equipped with a bore, an opening in the body portion smaller in size than said recess in the body portion, a transparent plate and closure plate in said body recess, said closure plate provided with ears equipped each with an aperture, said ears engageable in the smaller recesses and securing means cooperating with the apertures in said ears and the bores in said smaller recesses.

3. A motor vehicle certificate holder comprising a body portion, an arm extending therefrom provided with right angularly disposed lugs, an arcuate portion in the outer angular wall of each of said lugs, said lugs equipped with apertures, one wall of said arm being offset from said body portion, the body portion provided with a recess and smaller recesses communicating with the body recess, the smaller recesses equipped with a bore, an opening in the body portion smaller in size than said recess in the body portion, a transparent plate and closure plate in said body recess, said closure plate provided with ears equipped with apertures, the ears of the closure plate engaging the smaller recesses in the body portion of said holder, a threaded member engaging the apertures in the ears of the closure plate and the bores in the smaller recesses for securely locking the transparent plate and closure plate in said body recess.

JOHN CHUCHIE.